(12) United States Patent
Boldrin

(10) Patent No.: US 10,733,253 B2
(45) Date of Patent: Aug. 4, 2020

(54) METHODS AND SYSTEMS FOR PROVIDING RESIDENCE RECOMMENDATIONS BASED ON PERSONAL INTERESTS

(71) Applicant: INTERNATIONAL BUSINESS MACHINES CORPORATION, Armonk, NY (US)

(72) Inventor: Brianne Boldrin, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 203 days.

(21) Appl. No.: 15/933,696

(22) Filed: Mar. 23, 2018

(65) Prior Publication Data

US 2019/0294697 A1 Sep. 26, 2019

(51) Int. Cl.
| G06F 16/95 | (2019.01) |
| G06F 16/9537 | (2019.01) |
| G06F 16/9535 | (2019.01) |
| G06F 16/2457 | (2019.01) |

(52) U.S. Cl.
CPC .... *G06F 16/9537* (2019.01); *G06F 16/24578* (2019.01); *G06F 16/9535* (2019.01)

(58) Field of Classification Search
CPC ................................................. G06F 16/24578
USPC ................................................. 707/705, 706
See application file for complete search history.

(56) References Cited

U.S. PATENT DOCUMENTS

| 6,070,160 | A | 5/2000 | Geary |
| 7,720,844 | B2 | 5/2010 | Chu et al. |
| 2010/0156933 | A1 | 6/2010 | Jones et al. |
| 2016/0350429 | A1* | 12/2016 | Trippie .................. H04L 67/18 |
| 2019/0236552 | A1* | 8/2019 | Rouseau ............ G06Q 10/1091 |

FOREIGN PATENT DOCUMENTS

CA 2767926 A1 1/2011

OTHER PUBLICATIONS

Jinhao et al., "Real Estate Recommender: Location Query for Selecting Spatial Objects," 2012 Third International Conference on Networking and Computing, 2012 (5 pages).

Yang et al., "Modeling User Activity Preference by Leveraging User Spatial Temporal Characteristics in LBSNs," IEEE Transactions on Systems, Man, and Cybernetics: Systems, vol. 45, No. 1, Jan. 2015 (14 pages).

Qiu et al., "Automatic Identification of User Interest for Personalized Search," In Proceedings of the 15th International Conference on World Wide Web, ACM, 2006 (10 pages).

* cited by examiner

Primary Examiner — Baoquoc N To
(74) Attorney, Agent, or Firm — Griffiths & Seaton PLLC

(57) ABSTRACT

Embodiments for providing residence recommendations by one or more processors are described. At least one interest associated with a user is determined. At least one interest location associated with the at least one interest is identified. A score for each of a plurality of potential residences for the user is calculated at least based on a distance between the respective potential residence and each of the at least one interest locations. A signal representative of the calculated score for each of the plurality of potential residences is generated.

21 Claims, 10 Drawing Sheets

METHODS AND SYSTEMS FOR PROVIDING RESIDENCE RECOMMENDATIONS BASED ON PERSONAL INTERESTS

BACKGROUND OF THE INVENTION

Field of the Invention

The present invention relates in general to computing systems, and more particularly, to various embodiments for providing residence recommendations based on personal interests.

Description of the Related Art

In modern society, many people relocate, or move, more than a dozen times in their lifetime. In many cases, these moves are to a new city, town, or state, and the individual has little to no knowledge about the new location/area. Typically, the individual hires a realtor who provides them with various options and pricing. However, the realtors often cannot provide advice in the same way a friend of the individual can. That is, a friend living in the area knows the tendencies of residents who live in the area, the good and bad parts of town, and most importantly, the individual looking to move (e.g., their interests and lifestyle).

Although there are many resources that contain information to help an individual in selecting a new residence, current systems do not tailor search results in a way that takes the individual's personal interests and lifestyle into account.

SUMMARY OF THE INVENTION

Various embodiments for providing residence recommendations by one or more processors are described. In one embodiment, by way of example only, a method for providing residence recommendations, again by one or more processors, is provided. At least one interest associated with a user is determined. At least one interest location associated with the at least one interest is identified. A score for each of a plurality of potential residences for the user is calculated at least based on a distance between the respective potential residence and each of the at least one interest locations. A signal representative of the calculated score for each of the plurality of potential residences is generated.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
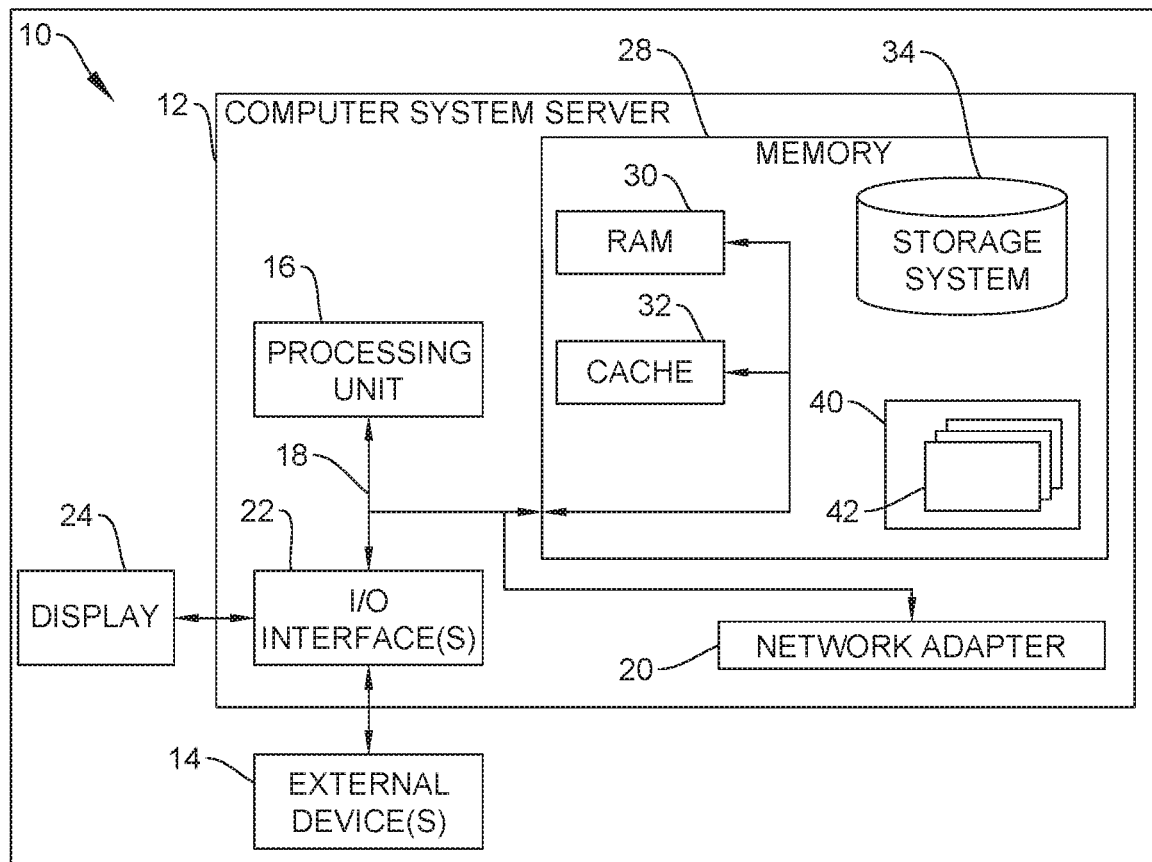
FIG. 1 is a block diagram depicting an exemplary computing node according to an embodiment of the present invention.

As discussed above, many people relocate, or move, more than a dozen times in their lifetime. In many cases, these moves are to a new area about which the individual knows very little. Although realtors can assist with providing options and pricing, they often do not know the individuals interest, lifestyle, etc. in the same way a close acquaintance (e.g., friend, family member, etc.) does.

There are also various services (e.g., websites, applications, etc.) available for assisting individuals in finding new residences by providing various types of information. For example, some websites combine listings from various sources on the internet into a single map-based interface. The individual may be able to set his/her work location and the target travel time from the location to highlight a specific region for possible listings. The user may also be asked for preferences, such as location, housing type (e.g., stand-alone house, apartment, etc.), number of bedrooms and/or bathrooms, price, pet policy, laundry, and amenities. After specifying a move in date and monthly budget, users may be able view suggested listings, perhaps including photographs, and highlight their favorite options. When reviewing the preferred options, appointments may be arranged for viewing or more information.

While the current systems provide users with information on listings based on location, they do not provide options based on their personal interests. Also, although maps may be provided that give the user some idea of the neighborhood, the user usually must conduct extensive research to learn more about typical neighbors and nearby activities from other resources. If the user was to search for a house or apartment using only one of these services, they would have no idea what the local area is like, what type of residents reside at the complex, and what shops, restaurants, activities, etc. are near that location.

That is, although there are many resources that contain information to help an individual in selecting a new residence, current systems do not tailor search results in a way that takes the individual's personal interests and lifestyle into account and/or cannot provide recommendations based on personal knowledge of the individual.

For example, a friend or family member of the individual may know that he/she is an avid runner (or jogger) and would most likely prefer to live near running trails and routes, such as a greenway. The friend may also have an understanding of the general lifestyle preferences of the individual. For example, the friend may realize that the individual recently graduated from college, is new to the area in question, and may prefer to live relatively close to other individuals who are young professionals, as well as near restaurants and bars.

There are currently no systems available that combine the individual's preferences (e.g., budget, location, room number, etc.) with the individual's personal interests, lifestyle, etc. in order to tailor recommendations with respect to housing searches.

To address these needs, some embodiments described herein provide methods and systems for providing residence recommendations based on, at least in part, the personal interests, lifestyle, preferences, etc. of the individual.

According to some embodiments described herein, this is accomplished utilizing data (structured and/or unstructured data) from external sources, such as various online sources (e.g., websites, databases, etc.) related to, for example, housing searches. Based on data from these sources, the system may map locations associated with interests and preferences, which are near each residence. For example, if it is determined that the individual (or user) is interested in outdoor activities, residences near parks and greenways may be identified. If the user enjoys trying new restaurants and unique finds, new up-and-coming restaurants in the area may be indicated and/or used to provide recommendations.

The individual's personal interests may be identified and/or determined in various ways. For example, in some embodiments, the individual may actively or explicitly indicate (or choose) his/her interests to the system (e.g., manual entry, pull down menus, etc.). However, in some embodiments, the individual's personal interests are (also) determined from searching and/or scanning data sources associated with the individual, such as social media activity and electronic communications (e.g., email, text messages, etc.). For example, the individual's social media activity (e.g., feedback left on social media, comments, etc.) may indicate that the individual has an interest in a particular subject or activity (e.g., running, golf, books, swimming, etc.), via, for example, keywords and key phrases (e.g., in social media posts and/or the user's comments). As such, in some embodiments, the individual's personal interests may (also) be determined or identified with little or no active input from the individual. Additionally, if the individual has social media contacts (or "friends") who live or work in the area, the individual may be alerted to this so that he/she may request validation of the recommendations from those people, assisting the individual in selecting an option.

In some embodiments, the individual's personal interests are utilized together with specific preferences with respect to housing, such as location, size, costs, amenities, etc. For example, prospective or potential residences may be initially selected based on the preferences indicated by the individual. The prospective residences may then be scored and/or ranked based on, for example, the proximity thereof to locations associated with the individual's personal interests.

In some embodiments, the individual may be able to provide feedback to the system regarding, for example, the identified personal interests and/or the scoring (or ranking) of the prospective residences. For example, if the individual believes that the system has inaccurately prioritized a particular interest (or activity), the individual may alert the system of such so that the prospective residences may be rescored and/or such feedback may be utilized in future searches. Further, the methods and systems described herein may utilize feedback left by other individuals (e.g., with respect to the embodiments described herein and/or feedback left on external data sources related to accommodations).

Although the present disclosure repeatedly refers to "housing" and/or "residential" searches, it should be understood that the embodiments described herein may be applied to any type of accommodations, related to personal living, recreation, and/or business. That is, besides assisting individuals in searching for residences, the methods and systems described herein may also be applied to searching for hotels, vacation rentals, commercial/business locations, etc.

In particular, in some embodiments, a method, by one or more processors, for providing residence recommendations, again by one or more processors, is provided. At least one interest associated with a user is determined. At least one interest location associated with the at least one interest is identified. A score for each of a plurality of potential residences for the user is calculated at least based on a distance between the respective potential residence and each of the at least one interest locations. A signal representative of the calculated score for each of the plurality of potential residences is generated.

A plurality of residence preferences associated with the user may be received. The plurality of potential residences may be selected based on the plurality of residence preferences.

Each of the selected plurality of potential residences may match at least a predetermined percentage of the received plurality of residence preferences. The determining of the at least one interest associated with the user may include at least one of receiving an indication of the at least one interest from the user, automatically searching at least one data source associated with the user, or a combination thereof.

The determining of the at least one interest associated with the user may include automatically searching at least one data source associated with the user, wherein the at least one data source includes at least one of social media activity, electronic communications, or a combination thereof.

The received plurality of residence preferences may include at least one residence amenity preference. The calculating of the score for each of the plurality of potential residences may include comparing amenities for each of the plurality of potential residences to the at least one amenity preference.

The generating of the signal representative of the calculated score for each of the plurality of potential residences may include causing an indication of the calculated scores for each of the plurality of potential residences to be displayed on a display device.

In some embodiments, the methods and/or systems described herein utilize "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, users' feedback, reactions, satisfaction, etc. with respect to the scoring of prospective residences based on personal interests, etc. as described herein. Utilizing the models, the performance (or operation) of the system (e.g., utilizing/based on new inputs) may be predicted and/or the performance of the system may be optimized by investigating how changes in the input(s) effect the output(s).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
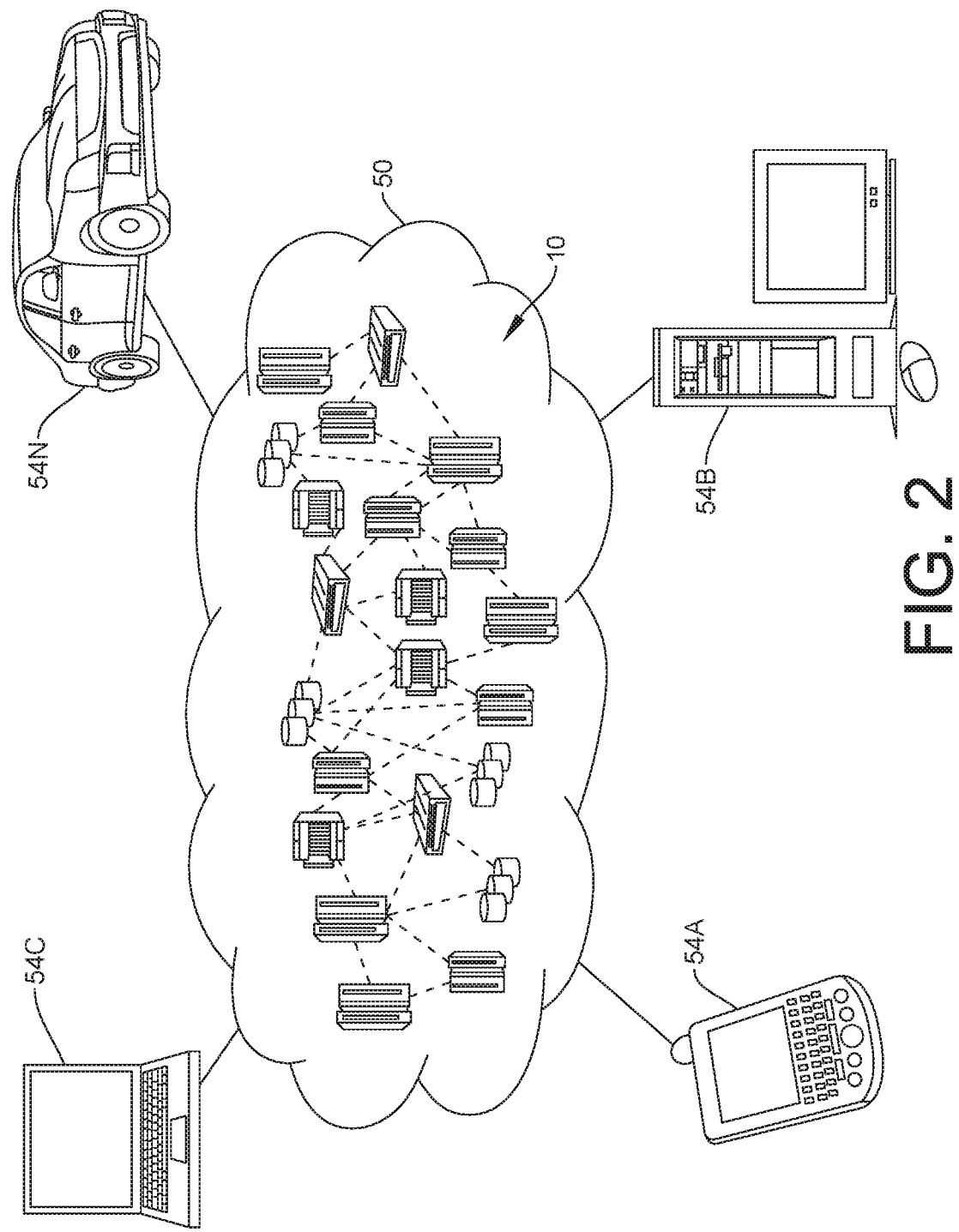
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular telephone or PDA 54A, desktop computer 54B, and/or laptop computer 54C, and vehicles (e.g., automobiles, aircraft, watercraft, etc.) 54N, may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
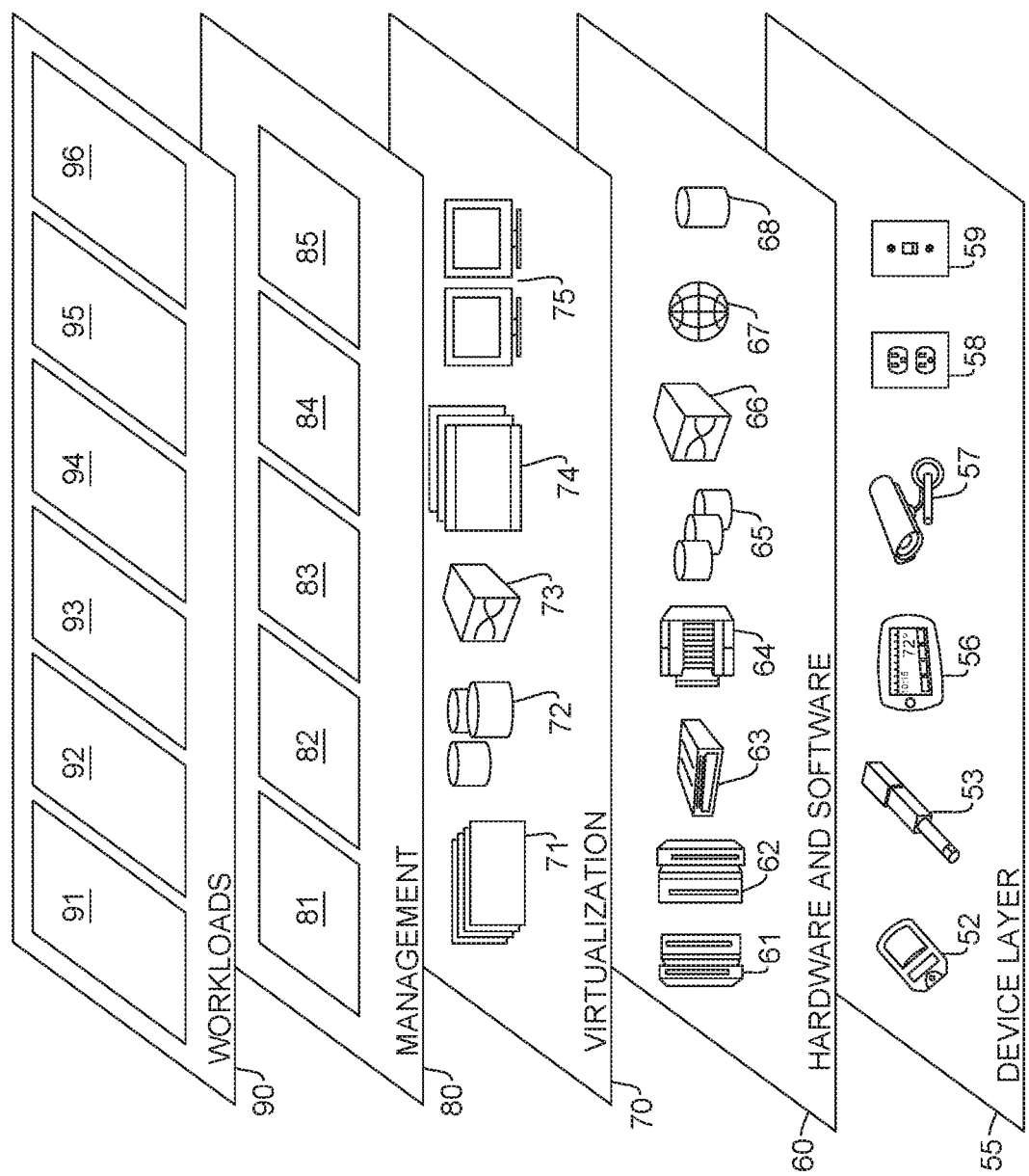
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for providing residence recommendations as described herein. One of ordinary skill in the art will appreciate that the workloads and functions 96 for providing residence recommendations may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

In some embodiments, the individual (or user) utilizes the methods and systems described herein using, for example, a software application (e.g., mobile application) or a website via a computing device, such as a mobile electronic device, desktop PC, etc. The individual may first create a "user account," as is commonly understood. For example, the individual may provide basic information, such as their name, age, gender, contact information, current address, move-in date, budget, etc. This profile may be stored by the system.

The individual may then enter (or select) the region in which they are looking for a residence. In some embodiments, the individual has the option to select a single, particular city (or town, county, locale, etc.) or a city and the surrounding area(s). If several cities are within a certain distance of each other (e.g., 10 miles), the individual may be provided with the option of selecting multiple cities, essentially creating a larger region for the residence search. Similarly, in some embodiments, the individual may be able to select a city along with any other cities within a particular distance (e.g., 20 miles) of the selected city. The user may also be able to limit the region. For example, the individual may be able to enter/select his/her work location and choose a maximum distance from that location. In some embodiments, only potential residences within the selected region will be presented to the individual.

In some embodiments, the individual also provides (or chooses, selects, etc.) "mandatory," or at least relatively important, residence preferences (or features). Examples include, but are not limited to, move-in date (e.g., availability of potential residences), budget (e.g., maximum rent, monthly payment, etc.), residence type (e.g., stand alone house, apartment, multi-family, etc.), and number of bedrooms and/or bathrooms (i.e., perhaps multiple options for number of bedrooms/bathrooms).

The individual may also add "optional," or at least relatively unimportant, residence preferences (or amenities). These options may include, for example, whether or not the residence has a swimming pool (e.g., private or community), fitness center, golf course, covered parking, furnished/unfurnished, deck/patio, pet policy, laundry, and elevator.

In some embodiments, the individual also adds at least some of their personal interests (or activities, etc.). For example, the individual may be able to manually enter various personal interests of theirs. However, in some embodiments, the individual may be able to select from a list including, for example, museums, nature & parks, sights/landmarks, tours, shopping, fun/games, outdoor activities, nightlife, concerts, water/amusement parks, and spas/wellness. The number of personal interests that may be entered and/or selected may be limited (e.g., a maximum of four categories) to limit the number of potential residences.

Each possible interest may be mapped to trigger words or keywords (or key phrases). For example, if the individual enters running/jogging as a personal interest, as described below, the system searches for greenways (or greenbelts), large parks, running trails, established running clubs/stores, etc. In some embodiments, the system links potential specified interests to preset trigger words that search for the locations within the selected region that are associated with the personal interest(s), such as restaurants, churches, parks, museums, gyms, music venues, etc., which may be identified using various data sources (e.g., online data sources, such as travel-related websites).

In some embodiments, the individual also indicates their dining preferences. For example, the individual may indicate how often they eat out, their preferred types of cuisine, and/or the type of restaurant(s) they frequently attend. This option may be included regardless of whether or not restaurants/food was indicated as a personal interest of the individual. These actions may group all of the desired interest locations as key search words.

In some embodiments, personal interests of the individual may (also) be determined (or identified) automatically. For example, the individual may optionally grant the system to one or more sources of data associated with the individual (or personal data sources), such as social media profiles/activity, electronic communications (e.g., emails, text messages, etc.), online accounts (e.g., related to shopping), etc. Information may be identified in such data sources that allow the system to determine the personal interests of the individual. For example, with respect to social media, personal interests may be identified or determined based on keywords identified in social media posts that the individual responded to and/or comments left by the individual or social media groups to which the individual belongs (e.g., a running/jogging group). The identified personal interests may be added to the individual's profile and used in scoring/grading potential residences as described below. In some embodiments, the individual's contacts (e.g., via social media, emails, etc.) may also be searched for people who live or work in the region in which the individual is searching for a residence.

In some embodiments, all of the information described above is stored in the individual's user profile and then used to perform a search for residences as described below. However, it should be understood that in some embodiments, the various types of information may simply be entered each time the individual desires to perform a search (i.e., no user profile is created/stored). It should also be understood that the various steps described (e.g., entering/determining the various types of information) may be performed in a different order than those described herein (e.g., the user's personal interests may be selected/determined first).

When a search is to be performed, in some embodiments, the system searches various data sources (e.g., online databases, websites, etc.) to locate potential residences for the individual as well as locations associated with the individual's personal interests. For example, various sources of structured and unstructured data may be utilized, such as websites related to locating/finding housing, travel-related websites, online mapping applications, online reviews, etc.

Figure 4:
FIGS. 4-6 are plan views of a map of a region illustrating various aspects of functionality according to an embodiment of the present invention.

Referring now to FIG. 4, a map 400 of an exemplary region is shown. The region may correspond to a region selected by an individual for a housing search as described above. In some embodiments, the map 400 shown may be displayed on a display screen of a computing device (e.g., a mobile electronic device, desktop PC, etc.). However, it should be understood that the map 400 may be provided to illustrate the functionality of the methods and systems described herein. In the depicted embodiment, the region corresponds to an urban area (e.g., a city or town) with various roadways, landmarks, etc. However, it should be understood that the region is simply provided as an example, as any region may be used, including rural areas or regions with multiple cities/towns that are separated by rural areas.

Figure 5:
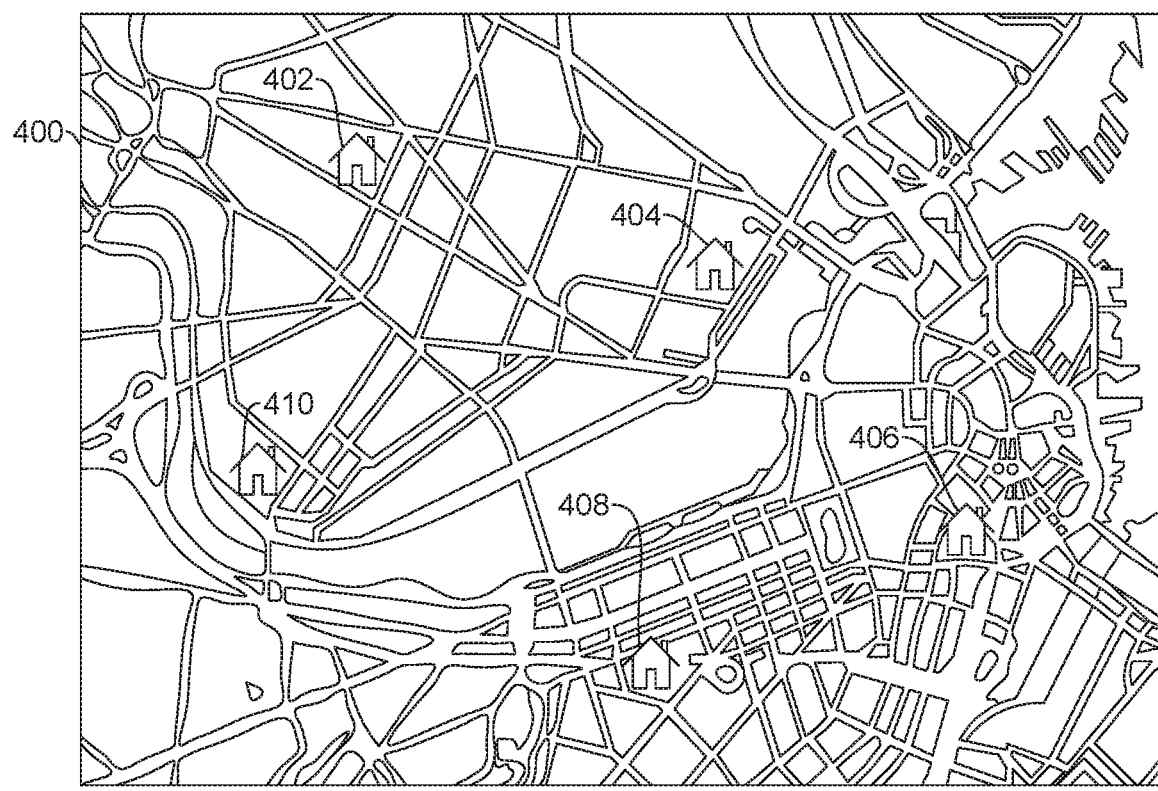

Referring now to FIG. 5, in some embodiments, all residential listings in the region 400 that fit/match the mandatory preferences of the user (e.g., number of bedrooms/bathrooms, residence type, budget, etc.) are identified and displayed. In the example shown, five such residences 402-410 (and the locations thereof) are displayed on the map 400. In some embodiments, rather than selecting all such listings, the potential residences are further filtered based on the individual's optional preferences. For example, in some embodiments, only the listings that fit all of the individual's mandatory preferences and a predetermined percentage (e.g., 60%) of the individual's optional preferences are selected (or identified) and displayed.

Figure 6:

The individual's personal interests (or activities) are then determined/entered and/or utilized to identify locations associated with those interests (or interest locations) in the region. The interests may be linked to common location words that match the interests (through established trigger words). As described above, locations that match the interests may be identified through various data sources, such as online databases, websites, etc. As described above, in some embodiments, the individual selects a particular number of interests (e.g., his/her most important), and only locations associated with those interests are utilized. Further, in some embodiments, the available data sources are utilized so that only the interest locations associated with businesses, activities, etc. that have an average rating above a predetermined threshold (e.g., 3.5 out of 5) are selected. For example, only restaurants with at least an average rating of 3.5 out of 5 may be selected and/or utilized as described below. The appropriate interest locations within the region, which are associated with the individual's personal interests, are mapped, as shown in FIG. 6. In the example shown, six interest locations 412-422 are shown (though it should be noted that this number may vary significantly in other embodiments).

Still referring to FIG. 6, an "interest point score" is then determined or calculated for each of the potential residences 402-410 (i.e., the potential residences 402-410 are scored with respect to the interest locations 412-422 in the region). As one exemplary method for scoring (and/or ranking) the potential residences 402-410, each of the potential residences may be awarded points based on the proximity thereof to the various interest locations 412-422. For example, each potential residence may be awarded one or more points for each interest location within a predetermined distance/range (e.g., 4 miles).

In some embodiments, the interest locations are grouped into four different categories with respect to their distance from each of the potential residences: Category A, Category B, Category C, and Category D. In such an embodiment, each of the potential residences 402-410 may be awarded 8 points for each of the interest locations within 0.5 miles of that residence (i.e., Category A), 5 points for each of the interest locations between 0.51 and 1.0 mile (Category B), 3 points for each between 1.1 and 2.0 miles (Category C), and 1 point for each of the interest locations between 2.1 and 4.0 miles (Category D). In this manner, an interest point score may be determined or calculated for each of the potential residences.

In some embodiments, a final residence score for each of the potential residences is then determined or calculated. The final residence score may be determined by multiplying the interest point score for each potential residence by the percentage of the individual's optional preferences (or amenities) that is matched/met by that residence. For example, if the interest point score for a particular potential residence is 30, and that potential residence has 80% of the optional preferences indicated by the individual, the final residence score would be 24.

A signal representative of the final residence score for each of the potential residences may then be generated, resulting in, for example, a list of the potential residences, along with the final residence scores thereof, being provided to the user (e.g., being displayed on a display device, sent via electronic communication, etc.). In some embodiments, the potential residences are listed in order based on their final residence scores (e.g., listed order of descending final residence score/from highest to lowest final residence score). Additionally, each residence may be displayed with the various details or information about the residence (e.g., type, size, amenities, costs, etc.) and/or the community/surrounding area (e.g., the interest locations within a particular distance).

The individual may be provided with the option to "save" (or select) or "discard" the recommended residences, perhaps individually or the entire list. Additionally, contact details (e.g., phone number, email address, etc.) may be provided to the individual for those of the recommended residences (or at least those that the individual has saved/selected) so that the individual may contact the appropriate entity regarding additional information.

In some embodiments, the individual may also be able to provide feedback to the system related to the recommended residences. For example, if the individual thinks the list of recommended residences and/or the scoring/ranking thereof does not accurately reflect his/her personal interests (and/or residence preferences), the individual may be able to indicate such. The feedback may be utilized by the system to perform the search/scoring again and/or for future residence searches (e.g., for the same individual and/or other individuals). It should be noted that the user feedback may be received and/or retrieved in any suitable manner. For example, the user may actively/intentionally provide feedback via questionnaires, etc., such as when they are provided with a list of recommended residences. Additionally, other forms of communication may be monitored (perhaps at the option of the user). For example, emails, texts, social media posts, etc. may be scanned for keywords indicative of the user's satisfaction with the search/scoring of the residences.

Further, in some embodiments, the individual's personal data (e.g., social media, emails, contact list, etc.) is searched for contacts who live/work in the region. If any such contacts are identified, the individual may be provided with an indication of such (e.g., via pop-up window, email, text message, etc.) so that the individual may seek additional advice.

Figure 7:
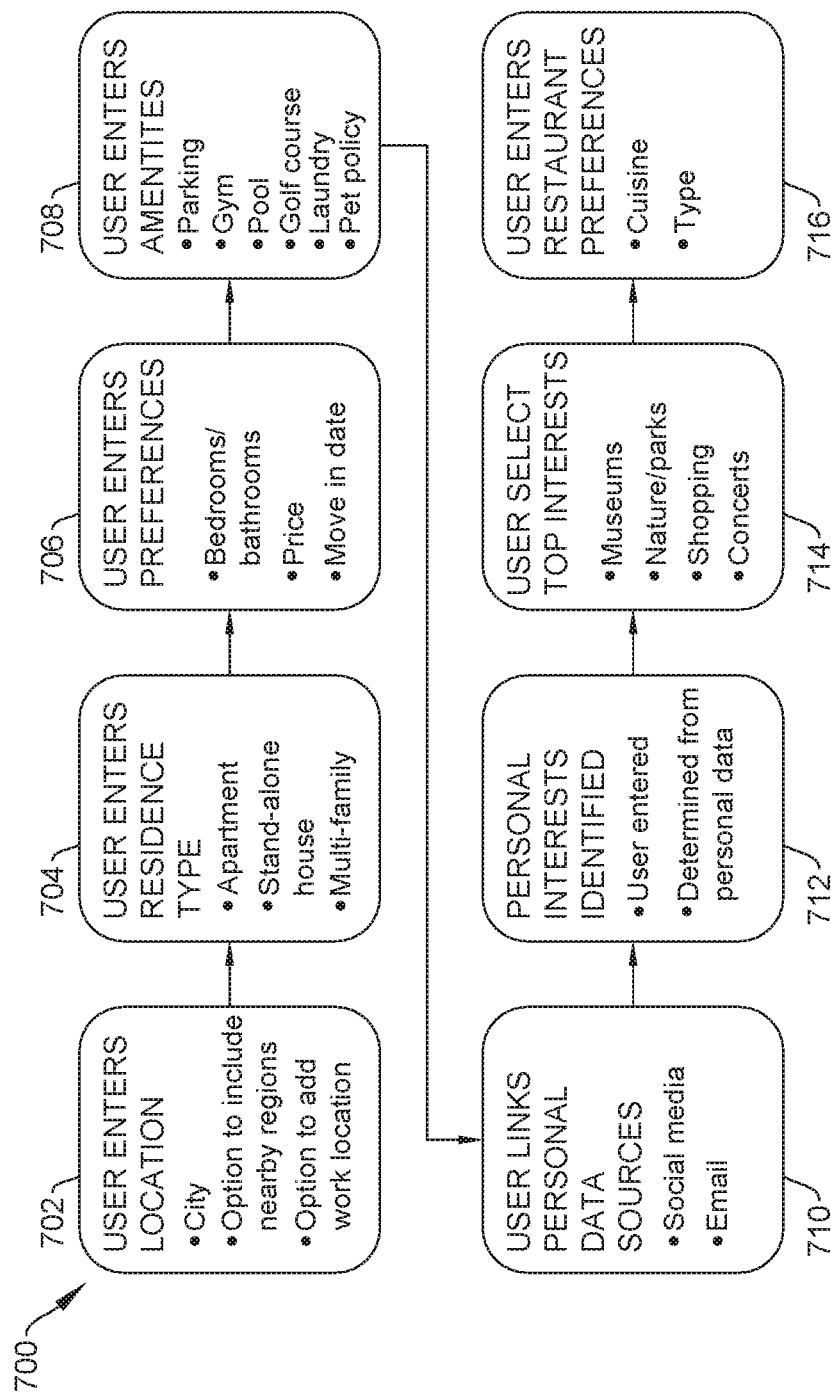
FIG. 7 is a flowchart/block diagram of a method for creating a user profile according to an embodiment of the present invention.

Referring now to FIG. 7, a flowchart/block diagram of a method (or apparatus logic) 700 for generating a user profile for an individual according to some embodiments is shown. However, it should be understood that the method 700 may also be applicable to the general process for collecting information related to the individual, which is utilized to perform the residence searches/scoring described herein (i.e., as opposed to the creating of a specific user profile).

At block 702, the user enters the location (or region) in which he/she is searching for a residence. As described above, the user may enter (or select) a city (or town), along with nearby regions/areas, as well as be provided the option to enter a work location. At block 704, the user enters the type(s) of residence he/she prefers or needs (e.g., apartment, stand-alone house, multi-family, etc.). At block 706, the user enters residence preferences (e.g., important or mandatory preferences), such as the number of bedrooms/bathrooms, price, move in date, etc. At block 708, the user enters desired amenities (e.g., relatively unimportant preferences), such as details related to parking, a gym, a pool, a golf course, laundry, pet policy, etc.

Still referring to FIG. 7, in some embodiments, at block 710, the user links (and/or grants the system access to) personal data sources, such as social media activity, emails, etc. At block 712, personal interests may be identified or determined. As described above, the personal interests of the user may be manually entered or selected by the user and/or determined from the personal data sources. In some embodiments, at block 714, the user selects a predetermined number of interests. For example, the user may select four personal interests (e.g., museums, nature/parks, shopping, and concerts) which are utilized to perform (and/or limit) the residence searching described herein. In some embodiments, at block 716, the user enters (or selects) details related to his/her restaurant preferences (e.g., cuisine, type of restaurant, etc.). It should be understood that the selection of restaurant preference may be utilized regardless of whether or not restaurants are determined to be one of the user's personal interests.

Figure 8:
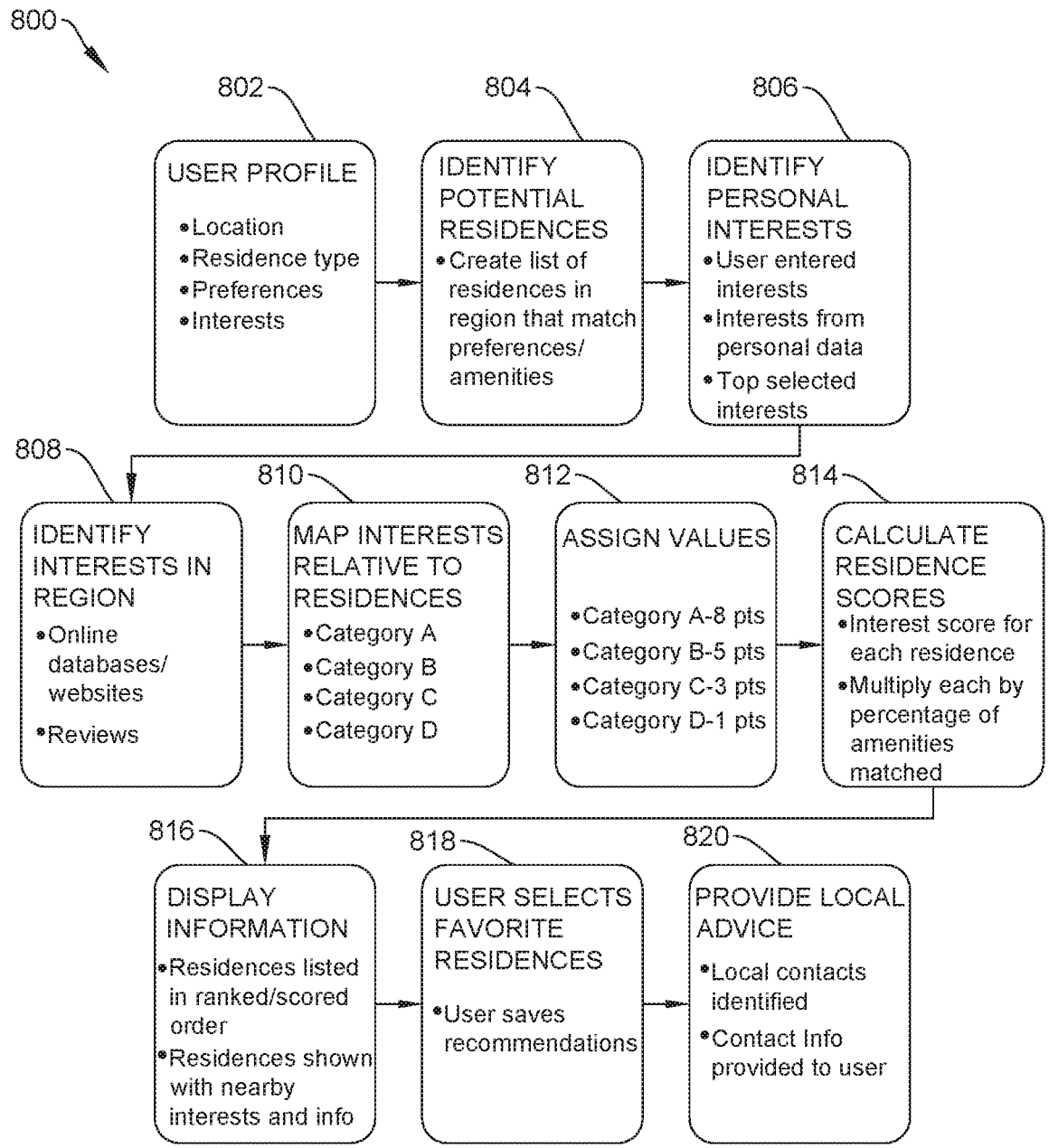
FIG. 8 is a flowchart/block diagram of a method for recommending residences according to an embodiment of the present invention.

Referring now to FIG. 8, a flowchart/block diagram of a method (or apparatus logic) 800 for recommending residences according to some embodiments is shown. At block 802, a user profile (e.g., from FIG. 7) is uploaded/received/retrieved. The user profile may contain, for example, the location/region for the search, the desired residence type, preferences, and personal interests of the user. At block 804, potential residences in the appropriate region are identified. That is, a list of residences in the region that (at least to some extent) match the user's preferences/amenities is created. At block 806, the personal interests of the user are retrieved from the user profile and/or otherwise determined. As described above, the personal interests may include user entered interests, interests identified from personal data sources, and a selection of the interests most important to the user.

Still referring to FIG. 8, at block 808, interest locations, associated with the personal interests of the user, within the region are identified and/or selected, as described above (e.g., via online databases/websites, reviews, etc.). At block 810, the interest locations are mapped relative to the potential residences. As described above, each of the interest locations may be categorized (e.g., Categories A-D) relative to each potential residence based on the distance between each interest location and each potential residence. At block 812, values are assigned to the categories (e.g., 8 points, 5 points, 3 points, and 1 point). At block 814, interest scores (or grades) for each of the potential residences are calculated. As described above, the interest scores may be calculated by adding the values for each of the interest locations within a range of the residence and multiplying the sum by the percentage of desired amenities included.

Continuing with FIG. 8, at block 816, the potential, or recommended, residences are displayed (or provided) to the user. The residences may be listed based on the calculated scores (e.g., highest to lowest) and other relevant information may be shown (e.g., nearby interest locations, amenities, etc.). At block 818, the user selects one or more of the recommended residences (e.g., the user saves at least some of the recommendations). At block 820, local advice may be provided by, for example, identifying contacts of the individual who live or work in the region and providing appropriate contact information.

Figure 9:
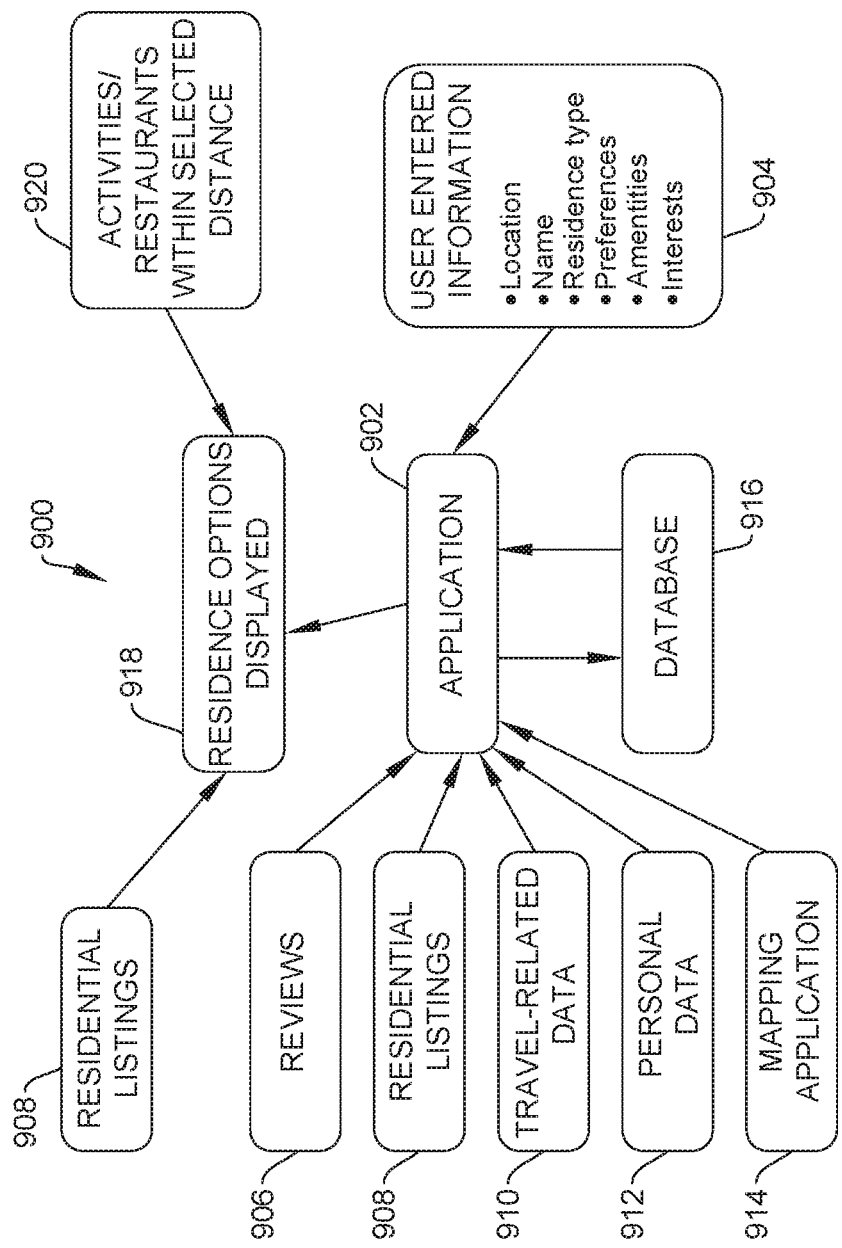
FIG. 9 is a flowchart/block diagram of a system for recommending residences according to an embodiment of the present invention.

FIG. 9 illustrates a flowchart/block diagram of a system (and/or data flow) 900 for recommending residences according to some embodiments described herein. As described above, a user (or individual) may access the systems/methods described herein via, for example, an application 902 on a computing device. The application 902 receives user entered information 904 (e.g., a user profile) and various types of information from external data sources (e.g., online databases, websites, etc.), such as reviews 906, residential listings 908, travel-related data 910, personal data (e.g., social media, emails, etc.) 912, and a mapping application 914, and may store any appropriate information/data (e.g., user information, saved searches, etc.) on a database (or memory) 916. Recommended residence options 918 are identified and displayed, utilizing the residential listings 908 and activities/restaurants in the region (e.g., interest locations) 920, as described above.

Figure 10:
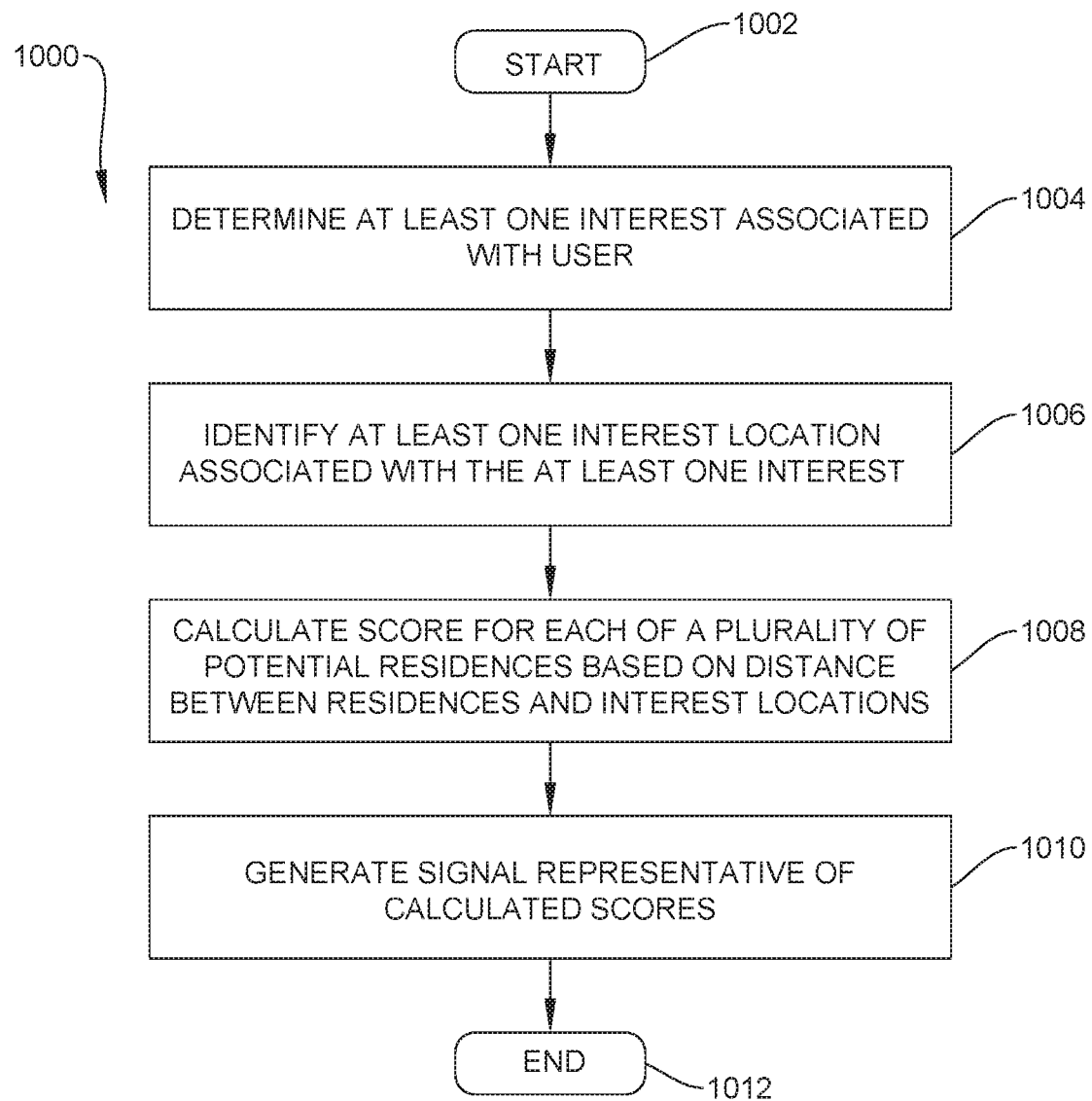
FIG. 10 is a flowchart diagram of an exemplary method for providing residence recommendations according to an embodiment of the present invention.

Turning to FIG. 10, a flowchart diagram of an exemplary method 1000 for providing residence recommendations, in accordance with various aspects of the present invention, is provided. Method 1000 begins (step 1002) with, for example, a user (or individual) deciding he/she desires to locate a new residence (or other type of accommodations) in a particular region and/or creating a user profile as described above.

At least one interest associated with the user is determined (step 1004). The determining of the at least one interest associated with the user may include at least one of receiving an indication of the at least one interest from the user, automatically searching at least one data source associated with the user, or a combination thereof.

At least one interest location associated with the at least one interest is identified (step 1006). As described above, the at least one interest location may be identified utilizing external data sources, such as online databases, websites, etc.

A score for each of a plurality of potential residences for the user is calculated at least based on a distance between the respective potential residence and each of the at least one interest locations (step 1008). The plurality of potential residences may be selected based on a plurality of received residence preferences. The received plurality of residence preferences may include at least one residence amenity preference. The calculating of the score for each of the plurality of potential residences may include comparing amenities for each of the plurality of potential residences to the at least one amenity preference. Each of the selected plurality of potential residences may match at least a predetermined percentage of the received plurality of residence preferences.

A signal representative of the calculated score for each of the plurality of potential residences is generated (step 1010). The generating of the signal representative of the calculated score for each of the plurality of potential residences may include causing an indication of the calculated scores for each of the plurality of potential residences to be displayed on a display device.

Method 1000 ends (step 1012) with, for example, the user selecting at least one of the potential residences based on, for example, the calculated scores. The user may provide feedback (e.g., related to the identified interests, etc.), which may be utilized in subsequent processes/searches.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for providing residence recommendations comprising:
   determining at least one interest associated with a user;
   identifying at least one interest location associated with the at least one interest;
   calculating a score for each of a plurality of potential residences for the user at least based on a distance between the respective potential residence and each of the at least one interest locations, wherein calculating the score includes awarding a predetermined number of points to the respective potential residence for each of the at least one interest locations within a respective distance range; and
   generating a signal representative of the calculated score for each of the plurality of potential residences.

2. The method of claim 1, further comprising:
   receiving a plurality of residence preferences associated with the user; and
   selecting the plurality of potential residences based on the plurality of residence preferences.

3. The method of claim 2, wherein each of the selected plurality of potential residences matches at least a predetermined percentage of the received plurality of residence preferences.

4. The method of claim 1, wherein the determining of the at least one interest associated with the user includes at least one of receiving an indication of the at least one interest from the user, automatically searching at least one data source associated with the user, or a combination thereof.

5. The method of claim 1, wherein the determining of the at least one interest associated with the user includes automatically searching at least one data source associated with the user, wherein the at least one data source includes at least one of social media activity, electronic communications, or a combination thereof.

6. The method of claim 2, wherein the received plurality of residence preferences includes at least one residence amenity preference, and the calculating of the score for each of the plurality of potential residences includes comparing amenities for each of the plurality of potential residences to the at least one amenity preference.

7. The method of claim 1, wherein the generating of the signal representative of the calculated score for each of the plurality of potential residences includes causing an indication of the calculated scores for each of the plurality of potential residences to be displayed on a display device.

8. A system for providing residence recommendations comprising:
   at least one processor that
      determines at least one interest associated with a user;
      identifies at least one interest location associated with the at least one interest;
      calculates a score for each of a plurality of potential residences at least based on a distance between the respective potential residence and each of the at least one interest locations, wherein calculating the score includes awarding a predetermined number of points to the respective potential residence for each of the at least one interest locations within a respective distance range; and
      generates a signal representative of the calculated score for each of the plurality of potential residences.

9. The system of claim 8, wherein the at least one processor further:
   receives a plurality of residence preferences associated with the user; and
   selects the plurality of potential residences based on the plurality of residence preferences.

10. The system of claim 9, wherein each of the selected plurality of potential residences matches at least a predetermined percentage of the received plurality of residence preferences.

11. The system of claim 8, wherein the determining of the at least one interest associated with the user includes at least one of receiving an indication of the at least one interest from the user, automatically searching at least one data source associated with the user, or a combination thereof.

12. The system of claim 8, wherein the determining of the at least one interest associated with the user includes automatically searching at least one data source associated with the user, wherein the at least one data source includes at least one of social media activity, electronic communications, or a combination thereof.

13. The system of claim 9, wherein the received plurality of residence preferences includes at least one residence amenity preference, and the calculating of the score for each of the plurality of potential residences includes comparing amenities for each of the plurality of potential residences to the at least one amenity preference.

14. The system of claim 8, wherein the generating of the signal representative of the calculated score for each of the plurality of potential residences includes causing an indication of the calculated scores for each of the plurality of potential residences to be displayed on a display device.

15. A computer program product for providing residence recommendations by one or more processors, the computer program product comprising a non-transitory computer-readable storage medium having computer-readable program code portions stored therein, the computer-readable program code portions comprising:

an executable portion that determines at least one interest associated with a user;

an executable portion that identifies at least one interest location associated with the at least one interest;

an executable portion that calculates a score for each of the plurality of potential residences at least based on a distance between the respective potential residence and each of the at least one interest locations, wherein calculating the score includes awarding a predetermined number of points to the respective potential residence for each of the at least one interest locations within a respective distance range; and an executable portion that generates a signal representative of the calculated score for each of the plurality of potential residences.

16. The computer program product of claim 15, wherein the computer-readable program code portions further include:

an executable portion that receives a plurality of residence preferences associated with the user; and an executable portion that selects the plurality of potential residences based on the plurality of residence preferences.

17. The computer program product of claim 16, wherein each of the selected plurality of potential residences matches at least a predetermined percentage of the received plurality of residence preferences.

18. The computer program product of claim 15, wherein the determining of the at least one interest associated with the user includes at least one of receiving an indication of the at least one interest from the user, automatically searching at least one data source associated with the user, or a combination thereof.

19. The computer program product of claim 15, wherein the determining of the at least one interest associated with the user includes automatically searching at least one data source associated with the user, wherein the at least one data source includes at least one of social media activity, electronic communications, or a combination thereof.

20. The computer program product of claim 16, wherein the received plurality of residence preferences includes at least one residence amenity preference, and the calculating of the score for each of the plurality of potential residences includes comparing amenities for each of the plurality of potential residences to the at least one amenity preference.

21. The computer program product of claim 15, wherein the generating of the signal representative of the calculated score for each of the plurality of potential residences includes causing an indication of the calculated scores for each of the plurality of potential residences to be displayed on a display device.

* * * * *